United States Patent
Nagara et al.

(10) Patent No.: US 11,373,812 B2
(45) Date of Patent: Jun. 28, 2022

(54) ELECTROLYTIC CAPACITOR MODULE

(71) Applicant: Panasonic Intellectual Property Management Co., Ltd., Osaka (JP)

(72) Inventors: Hisao Nagara, Yamaguchi (JP); Takayuki Matsumoto, Saga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/984,768

(22) Filed: Aug. 4, 2020

(65) Prior Publication Data

US 2020/0365331 A1 Nov. 19, 2020

Related U.S. Application Data

(63) Continuation of application No. PCT/JP2019/006440, filed on Feb. 21, 2019.

(30) Foreign Application Priority Data

Feb. 28, 2018 (JP) .............................. JP2018-035413

(51) Int. Cl.
*H01G 9/10* (2006.01)
*H01G 9/00* (2006.01)
(Continued)

(52) U.S. Cl.
CPC ................. *H01G 9/10* (2013.01); *H01G 2/02* (2013.01); *H01G 2/08* (2013.01); *H01G 9/0003* (2013.01); *H01G 9/008* (2013.01); *H01G 9/145* (2013.01)

(58) Field of Classification Search
CPC ............. H01G 9/08; H01G 9/015; H01G 2/08
See application file for complete search history.

(56) References Cited

U.S. PATENT DOCUMENTS 4,677,523 A * 6/1987 Kauppi .................... H01G 4/38
361/329
7,570,479 B2 8/2009 Lin
(Continued)

FOREIGN PATENT DOCUMENTS

JP 55-145042 U 10/1980
JP 7-283071 10/1995
(Continued)

OTHER PUBLICATIONS

International Search Report of PCT application No. PCT/JP2019/006440 dated May 14, 2019.
(Continued)

*Primary Examiner* — Eric W Thomas
(74) *Attorney, Agent, or Firm* — McDermott Will & Emery LLP

(57) ABSTRACT

An electrolytic capacitor module includes a plurality of capacitor elements, an electrode lead, a sealing member, and a heat dissipation member. The electrode lead is electrically connected to each of the plurality of capacitor elements, and penetrates through the sealing member. The heat dissipation member has a plurality of housing portions that respectively house the plurality of capacitor elements. Further, the heat dissipation member has a first surface and a second surface opposite to the first surface. Each of the plurality of housing portions has an insertion opening opened in the first surface. The sealing member seals the insertion opening. The electrode lead is led out from the insertion opening.

20 Claims, 4 Drawing Sheets

(51) Int. Cl.
H01G 9/008 (2006.01)
H01G 9/145 (2006.01)
H01G 2/08 (2006.01)
H01G 2/02 (2006.01)

(56) References Cited

U.S. PATENT DOCUMENTS

| | | | |
|---|---|---|---|
| 9,831,043 B2 * | 11/2017 | Roumi | H01M 8/0206 |
| 2009/0103248 A1 * | 4/2009 | Lin | H01G 9/08 361/537 |
| 2009/0303663 A1 * | 12/2009 | Bourcier | H01G 11/22 361/523 |

FOREIGN PATENT DOCUMENTS

| | | |
|---|---|---|
| JP | 2004-335829 | 11/2004 |
| JP | 2006-253280 | 9/2006 |
| JP | 2007-281127 | 10/2007 |
| JP | 2012-104284 | 5/2012 |
| JP | 5591655 B2 | 9/2014 |
| JP | 2017-168778 | 9/2017 |

OTHER PUBLICATIONS

English Translation of Chinese Office Action dated Sep. 14, 2021 for the related Chinese Patent Application No. 201980015043.8.

* cited by examiner

ELECTROLYTIC CAPACITOR MODULE

RELATED APPLICATIONS

This application is a continuation of the PCT International Application No. PCT/JP2019/006440 filed on Feb. 21, 2019, which claims the benefit of foreign priority of Japanese patent application No. 2018-035413 filed on Feb. 28, 2018, the contents all of which are incorporated herein by reference.

BACKGROUND

1. Technical Field

The present disclosure relates to an electrolytic capacitor module including a plurality of capacitor elements.

2. Description of the Related Art

When an alternating voltage is applied to an electrolytic capacitor, an alternating charge/discharge current (ripple current) flows in the electrolytic capacitor. Since the capacitor element that constitutes the electrolytic capacitor has internal resistance, which is called as equivalent series resistance (ESR), heat due to the ripple current is generated. This heat may cause the capacitor element to deteriorate, and thus it may be difficult to use it for a long period of time. Hence, various heat dissipation measures have been taken. For example, Unexamined Japanese Patent Publication No. 7-283071 teaches a method of filling a space between a plurality of capacitor elements with a filler having a high coefficient of thermal conductivity to radiate heat.

SUMMARY

An electrolytic capacitor module of the present disclosure includes a plurality of capacitor elements, an electrode lead, a sealing member, and a heat dissipation member. The electrode lead is electrically connected to each of the plurality of capacitor elements, and penetrates through the sealing member. The heat dissipation member has a plurality of housing portions that respectively house the plurality of capacitor elements. Further, the heat dissipation member has a first surface and a second surface opposite to the first surface. Each of the plurality of housing portions has an insertion opening opened in the first surface. The sealing member seals the insertion opening. The electrode lead is led out from the insertion opening.

According to the present disclosure, the heat generated from the plurality of capacitor elements is easily radiated to the outside, so that the life can be extended and the ripple current can be set high.

DETAILED DESCRIPTION OF EMBODIMENT

Figure 1:
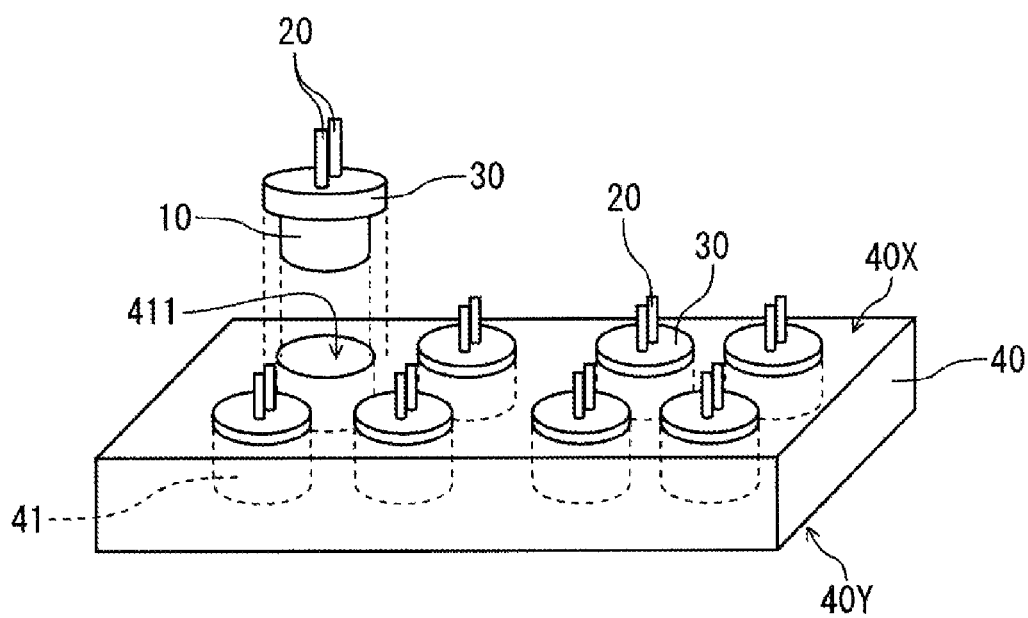
FIG. 1 is a perspective view schematically illustrating an example of an electrolytic capacitor module according to an exemplary embodiment of the present disclosure.

The electrolytic capacitor module according to the present exemplary embodiment includes a plurality of capacitor elements, an electrode lead electrically connected to each of the plurality of capacitor elements, a sealing member through which the electrode lead penetrates, and a heat dissipation member having a plurality of housing portions respectively housing the plurality of capacitor elements. The heat dissipation member has a first surface and a second surface opposite to the first surface. Each of the plurality of housing portions has an insertion opening opened in the first surface, and each of the plurality of capacitor elements is inserted through the insertion opening. The sealing member seals the insertion opening. The electrode lead penetrates the sealing member and is led out from the insertion opening.

The plurality of capacitor elements are not individually housed in an outer case, but are directly housed in the housing portions provided in the heat dissipation member, respectively. When an outer case is provided, the heat generated inside the capacitor element moves to the outer case and then moves to the heat dissipation member. Since a gap is likely to be formed between the outer case and the heat dissipation member, heat is transferred from the outer case to the heat dissipation member mainly by radiation or convection of gas. Hence, the heat dissipation efficiency is low. According to the present exemplary embodiment, since the capacitor element and the heat dissipation member are in contact with each other, the heat generated inside the capacitor element moves to the heat dissipation member mainly by heat conduction. Thus, heat dissipation efficiency is high. Further, in the present exemplary embodiment, since the filler as in Unexamined Japanese Patent Publication No. 7-283071 is not required, the productivity becomes high and thus the cost can be reduced.

In a preferred mode, the insertion opening of the housing portion is sealed by a sealing member having elasticity. The maximum diameter of the sealing member in a plane parallel to the first surface in the unloaded state is preferably larger than the maximum diameter of the insertion opening. As a result, the sealing member is less likely to take off from the insertion opening, and thus the fixability of the capacitor element is improved. Furthermore, when the electrolytic solution is stored in the housing portion together with the capacitor element, leakage of the electrolytic solution can be suppressed.

An inner wall of the housing portion has a contact region in contact with the sealing member, and the contact region may include one or more protrusions. Alternatively, the contact region may include an inclined surface that allows a cross section of the housing portion in a plane parallel to the first surface to have a smaller diameter as a position of the cross section is changed in a direction from the second surface toward the first surface. This makes it more difficult for the sealing member to take off from the insertion opening.

In another preferred mode, the thickness of the heat dissipation member is larger than the depth of the housing portion, and the housing portion is a recess formed on the first surface of the heat dissipation member. In this case, since the heat dissipation material constituting the heat dissipation member is disposed between the housing portions without a gap, the heat dissipation efficiency becomes high. Further, a cooling mechanism such as a coolant passage for passing a coolant can be formed between the housing portions of the heat dissipation member. Further, a cooling fin can be formed by excavating the second surface of the heat dissipation member.

The plurality of electrode leads led out from the insertion opening may be electrically connected to each other by a bus bar. In this case, it becomes easy to connect the capacitor elements in parallel, and the ESR is easily reduced. Further, the electrolytic capacitor module and the mounted electronic device can be easily connected via the bus bar.

Figure 2:
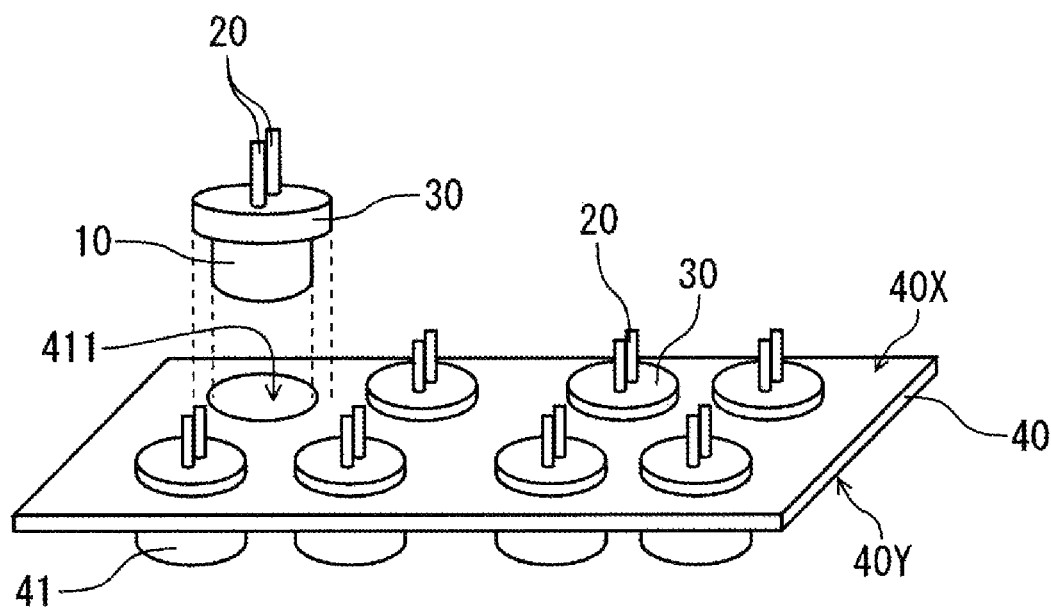
FIG. 2 is a perspective view schematically illustrating another example of the electrolytic capacitor module according to the exemplary embodiment of the present disclosure.
Figure 3:
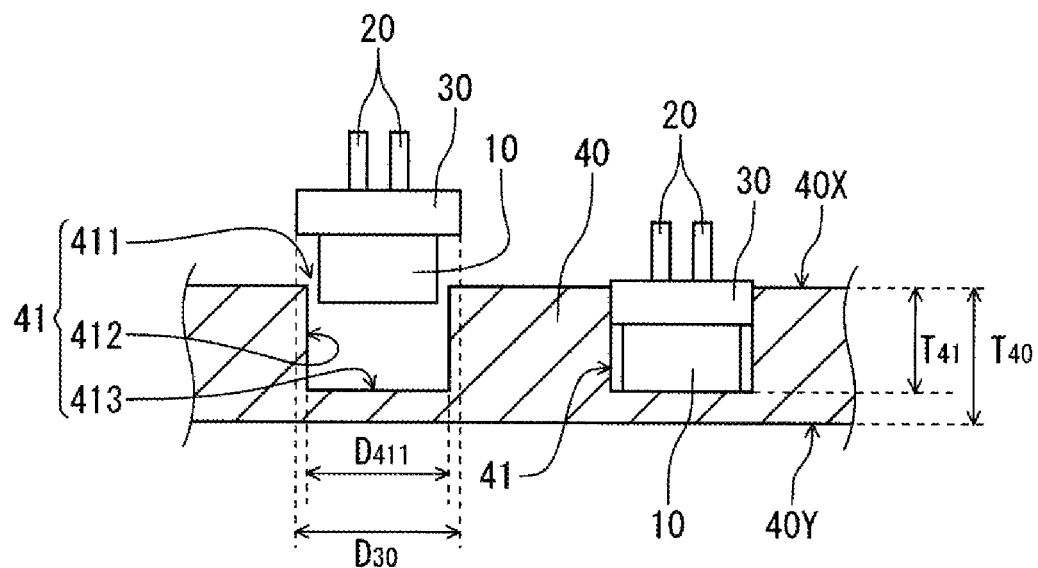
FIG. 3 is a cross-sectional view schematically illustrating a part of the electrolytic capacitor module according to the exemplary embodiment of the present disclosure.
Figure 4:
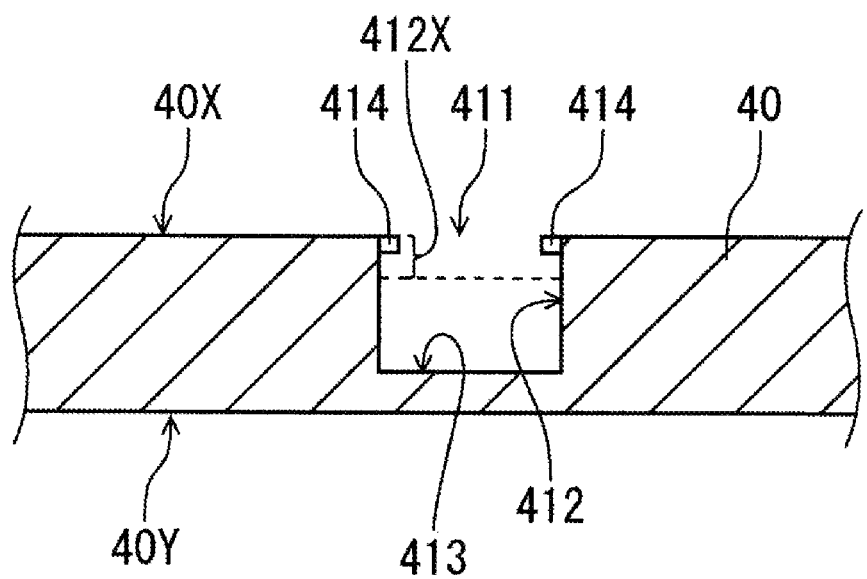
FIG. 4 is a cross-sectional view schematically illustrating a part of a heat dissipation member according to the exemplary embodiment of the present disclosure.
Figure 5:
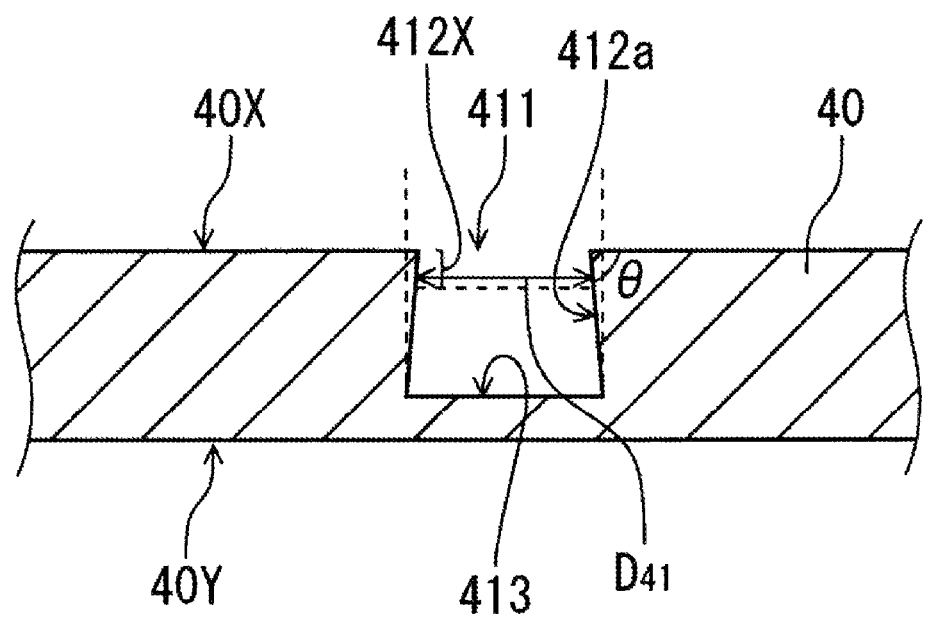
FIG. 5 is a cross-sectional view schematically illustrating a part of another heat dissipation member according to the exemplary embodiment of the present disclosure.
Figure 6:
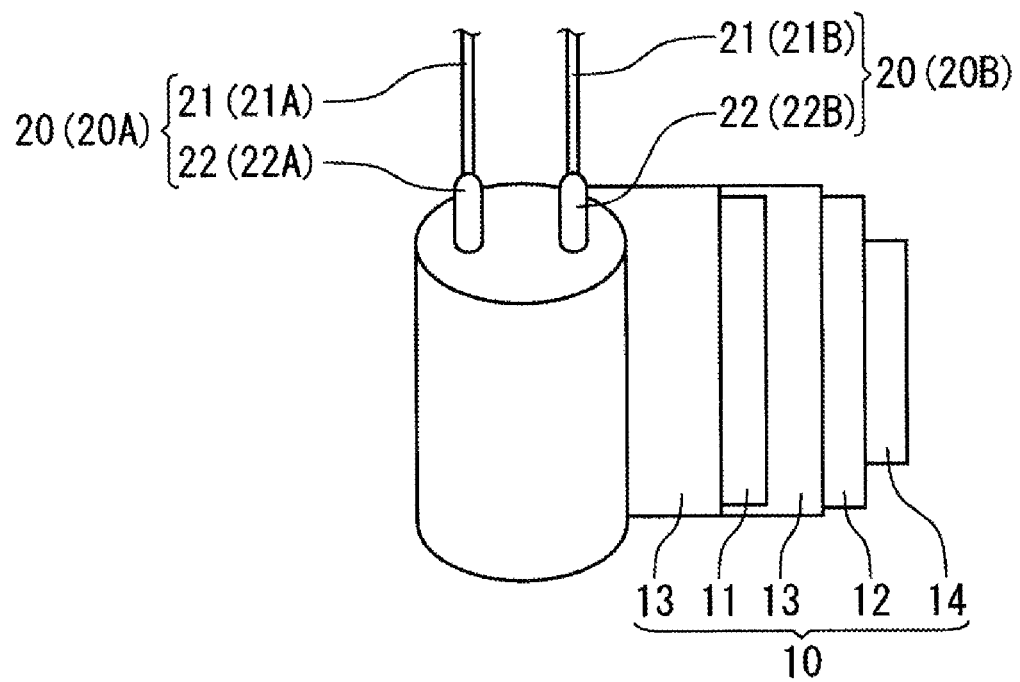
FIG. 6 is a schematic perspective view for explaining a configuration of a capacitor element according to the exemplary embodiment of the present disclosure.
Figure 7:
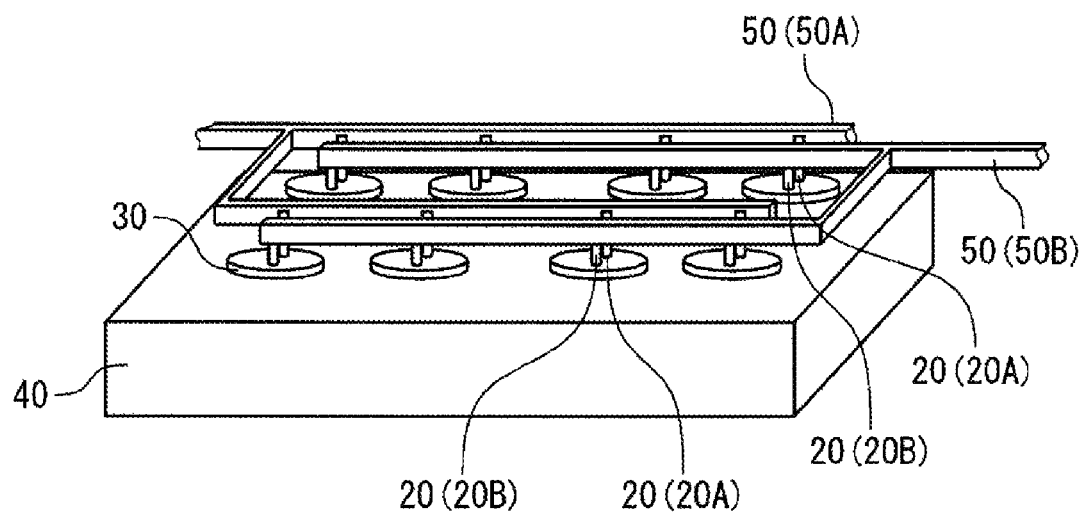
FIG. 7 is a perspective view schematically illustrating another example of the electrolytic capacitor module according to the exemplary embodiment of the present disclosure.

The present exemplary embodiment will be described below in detail with reference to drawings. FIGS. 1 and 2 are perspective views schematically illustrating the electrolytic capacitor module. FIG. 3 is a cross-sectional view schematically illustrating a part of the electrolytic capacitor module. FIG. 4 is a cross-sectional view schematically illustrating a part of the heat dissipation member. FIG. 5 is a cross-sectional view schematically illustrating a part of another heat dissipation member. FIG. 6 is a schematic perspective view for explaining the configuration of the capacitor element. FIG. 7 is a perspective view schematically illustrating another example of the electrolytic capacitor module. Meanwhile, the configurations of the electrolytic capacitor module and the capacitor element are not limited to this.

Heat Dissipation Member

The heat dissipation member radiates the heat generated inside the capacitor element to the outside. Further, the heat dissipation member functions as a case that collectively houses a plurality of capacitor elements.

Heat dissipation member 40 includes first surface 40X and second surface 40Y opposite to first surface 40X, and also has a plurality of housing portions 41 that respectively house a plurality of capacitor elements 10. Housing portion 41 has insertion opening 411 opened in first surface 40X. Capacitor element 10 is inserted through insertion opening 411. Insertion opening 411 is sealed by sealing member 30.

The shape of heat dissipation member 40 is not particularly limited. For example, thickness $T_{40}$ of heat dissipation member 40 may be larger than depth $T_{41}$ of housing portion 41. In this case, as shown in FIG. 1, housing portion 41 is a recess formed by, for example, excavating or embossing first surface 40X of heat dissipation member 40. Further, housing portion 41 is a recess formed together with first surface 40X when heat dissipation member 40 is molded using, for example, a mold.

Thickness $T_{40}$ of heat dissipation member 40 may be equal to or less than depth $T_{41}$ of housing portion 41. In this case, as shown in FIG. 2, housing portion 41 is a recess formed by, for example, pressing heat dissipation member 40. Among them, from the viewpoint of heat dissipation efficiency, it is preferable that thickness $T_{40}$ of heat dissipation member 40 is larger than depth $T_{41}$ of housing portion 41, and housing portion 41 is a recess formed in first surface 40X.

Thickness $T_{40}$ of heat dissipation member 40 is an average value of the shortest distances between first surface 40X and second surface 40Y at any three points. Depth $T_{41}$ of housing portion 41 is the maximum distance from insertion opening 411 to bottom portion 413 (see FIG. 3) of housing portion 41. Bottom portion 413 may be a flat surface or may include a curved surface portion.

A number of housing portions 41 is not particularly limited and may be set appropriately according to the application. The number of housing portions 41 may be, for example, 5 to 20. The shape and size of housing portion 41 are also not particularly limited. From the viewpoint of heat dissipation efficiency, it is preferable that the size of housing portion 41 is approximately the same as the size of capacitor element 10 to be housed. From the same viewpoint, it is preferable that the shape of housing portion 41 is similar to the shape of capacitor element 10 to be housed. This is because the contact area in inner wall 412 and/or bottom portion 413 of housing portion 41 with capacitor element 10 becomes large. Capacitor element 10 may be adhered to inner wall 412 and/or bottom portion 413 with a heat dissipation adhesive. The sizes and shapes of the plurality of housing portions 41 may be the same or different.

Inner wall 412 of housing portion 41 has contact region 412X in contact with sealing member 30, and contact region 412X may include one or more protrusions 414, as shown in FIG. 4. Protrusion 414 projects, for example, toward the center of insertion opening 411, and sealing member 30 is pressed by protrusion 414 and fixed to contact region 412X. Hence, sealing member 30 does not easily take off from insertion opening 411. The shape, arrangement, and a number of protrusions 414 are not particularly limited. Protrusions 414 may be evenly arranged at three or more locations in contact region 412X, for example.

Inner wall 412 of housing portion 41 has contact region 412X in contact with sealing member 30, and contact region 412X may include, as shown in FIG. 5, inclined surface 412a that allows diameter $D_{41}$ of a cross section of housing portion 41 in a plane parallel to first surface 40X to be smaller as a position of the cross section is changed in a direction from second surface 40Y toward first surface 40X. Sealing member 30 is pressed by inclined surface 412a and fixed to contact region 412X. Hence, sealing member 30 does not easily take off from insertion opening 411. Acute angle θ formed by inclined surface 412a and first surface 40X is not particularly limited. Acute angle θ is, for example, 60 degrees or more and less than 90 degrees. Contact region 412X (further, inner wall 412) may be formed only by inclined surface 412a, as shown in FIG. 5.

The material of heat dissipation member 40 is not particularly limited, and resin (epoxy resin, phenol resin, polyester resin, melamine resin, polyimide resin, etc.), metal (aluminum, iron, stainless steel, etc.), ceramics (aluminum oxide, zirconium dioxide, aluminum nitride, silicon nitride, etc.) and the like can be used. When a material having a low coefficient of thermal conductivity such as a resin is used for the heat dissipation member, for example, a filler having thermal conductivity is mixed with the material. The heat conductive filler is not particularly limited, and silver, copper, graphite, silicon carbide, aluminum oxide, boron nitride, silicon carbide, aluminum nitride, and the like can be illustrated. These may be used alone or in combination of two kinds or more. The thermal conductivity of the heat dissipation member is, for example, 1 W/m·K or more, and may be 2 W/m·K or more.

Sealing Member

Sealing member 30 seals insertion opening 411. Sealing member 30 may be an elastic body. The size and shape of sealing member 30 are not particularly limited, and may be appropriately set according to the size and shape of insertion opening 411 sealed by sealing member 30.

Maximum diameter $D_{30}$ (see FIG. 3) of sealing member 30 in the unloaded state in a plane parallel to first surface 40X is preferably larger than maximum diameter $D_{411}$ of insertion opening 411 sealed by sealing member 30. By press-fitting sealing member 30 having such a maximum diameter into housing portion 41, sealing member 30 is less likely to take off from insertion opening 411, and the fixability of capacitor element 10 is improved. Furthermore, when the electrolytic solution is stored in housing portion 41 together with capacitor element 10, leakage of the electrolytic solution is suppressed. The ratio of maximum diameter $D_{30}$ to maximum diameter $D_{411}$ is not particularly limited. $D_{30}/D_{411}$ may be 1.1 or more and 1.5 or less in terms of ease of press fitting and fixability of capacitor element 10.

The material of sealing member 30 is not particularly limited. Examples of elastic materials include rubbers such as silicone rubber, fluororubber, ethylene propylene rubber, Hypalon™ rubber, butyl rubber, and isoprene rubber. These are preferable in terms of high heat resistance.

Electrode Lead

Electrode lead 20 is electrically connected to capacitor element 10. Electrode lead 20 includes, for example, lead tab 22 joined to the electrode of capacitor element 10, and lead wire 21 that is electrically connected to lead tab 22, penetrates sealing member 30, and is led out from insertion opening 411 (See FIG. 6).

The material of lead tab 22 and lead wire 21 is not particularly limited as long as it is electrochemically and chemically stable and has conductivity, and may be metal or non-metal. The shape is also not particularly limited, and may be a flat plate shape or have a round cross section.

The plurality of electrode leads 20 led out from insertion openings 411 may be electrically connected to each other by bus bar 50 (see FIG. 7). As a result, capacitor elements 10 are easily connected in electrically parallel, and the ESR is easily reduced. At this time, electrode leads 20 having the same polarity (for example, electrode leads 20A or electrode leads 20B) are connected by one bus bar 50 (bus bar 50A or bus bar 50B). Bus bar 50 and electrode lead 20 are joined by, for example, resistance welding, laser welding, soldering, or the like.

Electrolytic capacitor module 100 can be connected to an electronic device via bus bar 50. Since the electrolytic capacitor is generally connected to an electronic device by soldering or the like, it is subjected to a reflow process. In the reflow process, the internal pressure of the electrolytic capacitor is likely to increase. Thus, in general, a vicinity of the open end of the outer case of the electrolytic capacitor is drawn inward, and the open end is curled to swage the sealing member in order to fix the sealing member to the outer case. In the present exemplary embodiment, since the reflow process for connecting the electrolytic capacitor to the electronic device is not required, it is possible to fix the sealing member without performing the drawing process and the curling process as described above. Hence, productivity can be easily improved.

The material of bus bar 50 is not particularly limited as long as it is electrochemically and chemically stable and has conductivity, and may be metal or non-metal. The shape is also not particularly limited, and may be appropriately set depending on the installation location of electrolytic capacitor module 100, the shape of the electronic device, and the like.

Capacitor Element

Capacitor element 10 includes, for example, as shown in FIG. 6, foil-shaped anode 11, foil-shaped cathode 12, and separator 13 disposed between the anode and the cathode. Anode 11 and cathode 12 are wound with separator 13 interposed between the anode and the cathode to form a wound body. The outermost circumference of the wound body is fixed by winding stop tape 14. Lead tab 22A including lead wire 21A is connected to anode 11, and lead tab 22B including lead wire 21B is connected to cathode 12. Capacitor element 10 may be a laminated type in which anode 11 and cathode 12 are laminated with separator 13 interposed.

Capacitor element 10 may include a sintered body (porous body) containing a valve metal as an anode body. When a sintered body is used, one end of the electrode lead on the anode side is embedded in the sintered body. The other end of the electrode lead penetrates sealing member 30 and is led out from insertion opening 411. Such a capacitor element includes, for example, an anode body, a dielectric layer covering the anode body, and a cathode part covering the dielectric layer. The cathode part includes, for example, a solid electrolyte layer covering the dielectric layer and a cathode lead-out layer covering the solid electrolyte layer.

Anode

Anode 11 includes an anode body and a dielectric layer covering the anode body (both not shown).

The anode body may include a valve metal, an alloy containing a valve metal, a compound containing a valve metal, or the like. These may be used alone or in combination of two types or more. As the valve metal, for example, aluminum, tantalum, niobium, or titanium is preferably used. The surface of the anode body is porous. Such an anode body can be obtained, for example, by roughening the surface of a base material (such as a foil-shaped or plate-shaped base material) containing a valve metal by etching or the like.

The dielectric layer includes an oxide of a valve metal (e.g., aluminum oxide, tantalum oxide). The dielectric layer is formed along a porous surface (a surface including inner wall faces of holes) of the anode body.

The dielectric layer is formed by, for example, anodizing, through an anodizing treatment or the like, the surface of the anode body. The anodizing can be performed by a publicly known method, for example, an anodizing treatment. The anodizing treatment can be performed by, for example, immersing the anode body in an anodizing solution to impregnate a surface of the anode body with the anodizing solution and applying a voltage between the anode body as an anode and a cathode immersed in the anodizing solution.

Cathode

Cathode 12 is not particularly limited as long as it has a function as a cathode. Similarly to anode 11, cathode 12 is formed of a valve metal, an alloy containing a valve metal, a compound containing a valve metal, or the like. The shape of cathode 12 may be the same as that of anode 11, and is, for example, a foil shape or a plate shape. The surface of cathode 12 may be roughened if necessary.

Separator

As separator 13, a cellulose fiber non-woven fabric, a glass fiber non-woven fabric, a polyolefin microporous membrane, a woven fabric, a non-woven fabric, or the like is preferably used.

Electrolyte

As the electrolyte, an electrolytic solution, a conductive polymer, or both of them can be used.

The electrolytic solution may be a non-aqueous solvent, or may be a mixture of the non-aqueous solvent and an ionic substance (solute, e.g., organic salt) dissolved in the non-aqueous solvent. The non-aqueous solvent may be an organic solvent or an ionic liquid. As the non-aqueous solvent, for example, ethylene glycol, propylene glycol, sulfolane, γ-butyrolactone, N-methylacetamide, or the like can be used. Examples of the organic salt include trimethylamine maleate, triethylamine borodisalicylate, ethydimethylamine phthalate, mono-1,2,3,4-tetramethylimidazolinium phthalate, and mono-1,3-dimethyl-2-ethylimidazolinium phthalate.

As the conductive polymer, for example, a manganese compound, polypyrrole, polythiophene, polyaniline, and their derivatives can be used. The conductive polymer is disposed as a solid electrolyte layer between anode 11 and cathode 12. The solid electrolyte layer may contain a dopant. More specifically, the solid electrolyte layer may contain poly (3,4-ethylenedioxythiophene) (PEDOT) as the conductive polymer and polystyrene sulfonic acid (PSS) as the dopant.

The solid electrolyte layer including a conductive polymer can be formed by, for example, chemical polymerization and/or electro polymerization of a raw material monomer on the dielectric layer, which is formed on the anode body. Alternatively, it can be formed by applying a solution in which a conductive polymer is dissolved or a dispersion liquid in which a conductive polymer is dispersed, to the dielectric layer.

An electrolytic capacitor module including a wound-type capacitor element is manufactured, for example, as follows.

First, capacitor element 10 is prepared. The anode body (metal foil) having a roughened surface is subjected to anodizing treatment to form a dielectric layer on the surface. Thereby, anode 11 can be obtained.

Obtained anode 11 and cathode 12 (metal foil) are wound with separator 13 interposed therebetween. At this time, one end of lead tab 22A or 22B is connected to each electrode, and each electrode is wound while winding lead tabs 22A and 22B. Lead wires 21A and 21B are connected to the other ends of lead tabs 22A and 22B, respectively. The end of outermost cathode 12 is fixed with winding tape 14.

An electrolyte (electrolyte solution and/or conductive polymer) is brought into contact with the formed wound body. The method of bringing the electrolyte into contact with the wound body is not particularly limited as long as the electrolyte is disposed at least between anode 11 and cathode 12. For example, the electrolyte may be dropped onto the wound body, or the wound body may be immersed in the electrolyte stored in the container. The contact between the wound body and the electrolyte may be performed after insertion of the wound body into heat dissipation member 40. When both the electrolytic solution and the conductive polymer are used, the solid electrolyte layer is formed by the conductive polymer and then the electrolytic solution is impregnated.

Capacitor element 10 is manufactured by the above method.

Secondly, sealing member 30 and heat dissipation member 40 are prepared. On first surface 40X of heat dissipation member 40, a plurality of recesses (housing portions 41) each having a desired size are formed by excavation. Maximum diameter $D_{30}$ of sealing member 30 is made larger than maximum diameter $D_{411}$ of insertion opening 411 sealed by sealing member 30.

Thirdly, lead wires 21A, 21B are penetrated through sealing member 30 to form a connected body of capacitor element 10 and sealing member 30.

Fourth, the obtained connected body is press-fitted into housing portion 41 such that lead wires 21A and 21B are led out from insertion opening 411. This completes the sealing of insertion opening 411 and the housing of capacitor element 10. Thereafter, the aging process may be performed while applying the rated voltage. Finally, bus bars 50A and 50B are joined to electrode lead 20A (lead wire 21A) and electrode lead 20B (lead wire 21B), respectively, if necessary.

Since the electrolytic capacitor module according to the present disclosure has excellent heat dissipation, it can be used for various applications.

What is claimed is:

1. An electrolytic capacitor module comprising:
   a plurality of capacitor elements;
   an electrode lead electrically connected to each of the plurality of capacitor elements;
   a sealing member through which the electrode lead penetrates; and
   a heat dissipation member having a plurality of housing portions, each of the plurality of housing portions housing a corresponding one of the plurality of capacitor elements, wherein:
   the heat dissipation member has a first surface and a second surface opposite to the first surface,
   each of the plurality of housing portions has an insertion opening opened in the first surface,
   the sealing member seals the insertion opening,
   the electrode lead is led out from the insertion opening,
   an inner wall of the each of the plurality of housing portions has a contact region that is in contact with the sealing member, and
   the contact region includes an inclined surface that allows a cross section of the each of the plurality of housing portions in a plane parallel to the first surface to have a smaller diameter as a position of the cross section is changed in a direction from the second surface toward the first surface.

2. The electrolytic capacitor module according to claim 1, wherein:
   the sealing member has elasticity, and
   in the plane parallel to the first surface, a maximum diameter of the sealing member in an unloaded state where a corresponding one of the plurality of capacitor elements is not inserted in the heat dissipation member is larger than a maximum diameter of the insertion opening.

3. The electrolytic capacitor module according to claim 1, wherein the contact region includes one or more protrusions.

4. The electrolytic capacitor module according to claim 1, wherein:

a thickness of the heat dissipation member is larger than a depth of the each of the plurality of housing portions, and the each of the plurality of housing portions is a recess formed on the first surface of the heat dissipation member.

5. The electrolytic capacitor module according to claim 1, further comprising a bus bar electrically connecting the electrode lead of one of the plurality of capacitor elements and the electrode lead of another one of the plurality of capacitor elements.

6. The electrolytic capacitor module according to claim 1, wherein each of the plurality of capacitor elements includes an anode body having a dielectric layer, a cathode body, and an electrolyte disposed between the anode body and the cathode body.

7. The electrolytic capacitor module according to claim 6, wherein the electrolyte includes a conductive polymer.

8. The electrolytic capacitor module according to claim 6, wherein the electrolyte includes an electrolytic solution.

9. The electrolytic capacitor module according to claim 1, wherein each of the plurality of capacitor elements is housed in a corresponding one of the plurality of housing portions without being housed in an individual outer case.

10. An electrolytic capacitor module comprising:
a plurality of capacitor elements arranged in a matrix having rows and columns;
a plurality of positive electrode leads, each of the plurality of positive electrode leads being electrically connected to a corresponding one of the plurality of capacitor elements;
a plurality of negative electrode leads, each of the plurality of negative electrode leads being electrically connected to the corresponding one of the plurality of capacitor elements;
a first bus bar electrically connecting the plurality of positive electrode leads;
a second bus bar electrically connecting the plurality of negative electrode leads;
a heat dissipation member having a plurality of housing portions, each of the plurality of housing portions housing a corresponding one of the plurality of capacitor elements; and
a plurality of sealing members, each of the plurality of sealing members sealing a corresponding one of the plurality of housing portions, wherein:
each of the plurality of positive electrode leads and each of the plurality of negative electrode leads penetrate a corresponding one of the plurality of sealing members,
the first bus bar is branched into a plurality of first sub-bus bars each extending in a row direction,
the second bus bar is branched into a plurality of second sub-bus bars each extending in the row direction,
each of the plurality of first sub-bus bars is connected to two or more positive electrode leads of two or more capacitor elements among the plurality of capacitor elements in one row of the matrix so that a side surface of the each of the plurality of first sub-bus bars is in direct contract with a side surface of each of the two or more positive electrode leads, and each of the plurality of second sub-bus bars is connected to two or more negative electrode leads of two or more capacitor elements among the plurality of capacitor elements in the one row of the matrix so that a side surface of the each of the plurality of second sub-bus bars is in direct contact with a side surface of each of the two or more negative electrode leads.

11. The electrolytic capacitor module according to claim 10, wherein each of the plurality of capacitor elements includes an anode body having a dielectric layer, a cathode body, and an electrolyte disposed between the anode body and the cathode body.

12. The electrolytic capacitor module according to claim 11, wherein the electrolyte includes a conductive polymer.

13. The electrolytic capacitor module according to claim 11, wherein the electrolyte includes an electrolytic solution.

14. The electrolytic capacitor module according to claim 10, wherein each of the plurality of capacitor elements is housed in a corresponding one of the plurality of housing portions without being housed in an individual outer case.

15. An electrolytic capacitor module comprising:
a plurality of capacitors, each of which includes:
a capacitor element;
an electrode lead electrically connected to the capacitor element; and
a sealing member through which the electrode lead passes; and
a heat dissipation member having a plurality of housing portions, wherein:
each of the plurality of housing portions houses a corresponding one of the plurality of capacitors,
the heat dissipation member has a first surface and a second surface opposite to the first surface,
each of the plurality of housing portions has an insertion opening opened in the first surface,
the sealing member seals the insertion opening, and
each of the plurality of housing portions has a top opening and a bottom, and the top opening is smaller in area than the bottom.

16. The electrolytic capacitor module according to claim 15, wherein the capacitor element includes an anode body having a dielectric layer, a cathode body, and an electrolyte disposed between the anode body and the cathode body.

17. The electrolytic capacitor module according to claim 16, wherein the electrolyte includes a conductive polymer.

18. The electrolytic capacitor module according to claim 16, wherein the electrolyte includes an electrolytic solution.

19. The electrolytic capacitor module according to claim 10, wherein:
the plurality of first sub-bus bars are continuously connected to each other, and
the plurality of second sub-bus bars are continuously connected to each other.

20. The electrolytic capacitor module according to claim 15, wherein the capacitor element is housed in a corresponding one of the plurality of housing portions without being housed in an individual outer case.

* * * * *